United States Patent
Guillaume et al.

(10) Patent No.: US 12,441,900 B2
(45) Date of Patent: Oct. 14, 2025

(54) WRITING GEL INK FOR PENS WITHOUT FOLLOWER

(71) Applicant: SOCIÉTÉ BIC, Clichy (FR)

(72) Inventors: Caffier Guillaume, Wegscheid (FR); Liu Wing Yam, Montevrain (FR)

(73) Assignee: SOCIÉTÉ BIC, Clichy (FR)

( * ) Notice: Subject to any disclaimer, the term of this patent is extended or adjusted under 35 U.S.C. 154(b) by 618 days.

(21) Appl. No.: 17/904,260

(22) PCT Filed: Feb. 26, 2021

(86) PCT No.: PCT/EP2021/054852
§ 371 (c)(1),
(2) Date: Aug. 15, 2022

(87) PCT Pub. No.: WO2021/170810
PCT Pub. Date: Sep. 2, 2021

(65) Prior Publication Data
US 2023/0093346 A1    Mar. 23, 2023

(30) Foreign Application Priority Data
Feb. 28, 2020   (EP) ..................................... 20315026

(51) Int. Cl.
*C09D 11/18* (2006.01)
*C08K 3/36* (2006.01)
*C09D 11/16* (2014.01)

(52) U.S. Cl.
CPC ................ *C09D 11/18* (2013.01); *C08K 3/36* (2013.01); *C09D 11/16* (2013.01)

(58) Field of Classification Search
CPC ............ C09D 11/18; C09D 11/16; C08K 3/36
(Continued)

(56) References Cited

U.S. PATENT DOCUMENTS 6,503,966 B1 * 1/2003 Fujii ...................... C09D 11/18
524/548
2011/0218277 A1    9/2011 Shah et al.
2011/0218282 A1    9/2011 Shah et al.

FOREIGN PATENT DOCUMENTS

CN    102203198 A    9/2011
EP    1101804 A1     5/2001
(Continued)

OTHER PUBLICATIONS

International Search Report issued in International Application PCT/EP2021/054852 on Jun. 1, 2021 (2 pages).

*Primary Examiner* — David J Walczak
(74) *Attorney, Agent, or Firm* — Bookoff McAndrews, PLLC (57) ABSTRACT

A writing instrument having a writing tip, the writing instrument comprising a non-aqueous writing ink which is contained in a tubular ink cartridge, wherein the tubular ink cartridge has an inner diameter of between about 1 mm and about 2.5 mm, and two open ends, wherein the first open end is connected with the writing tip and the second open end is connected with the external surroundings of the writing instrument, wherein the non-aqueous writing ink contained in a tubular ink cartridge is in fluid communication with the writing tip via the first open end and with the external surroundings of the writing instrument via the second open end, and wherein the non-aqueous writing ink comprises a solvent, a resin, a coloring agent, and a gelling agent.

20 Claims, 1 Drawing Sheet

| Example | Seepage 23°C 24h storage | Seepage 1 week storage 40°C/80% RH | Machine writing cleanliness | Machine writing regularity | Complete ink restitution | Hand writing cleanliness | Hand writing regularity | Gooping | Drop test without follower |
|---|---|---|---|---|---|---|---|---|---|
| Example 1 | 1.1 | 1 | 10 | 8.5 | Yes | 9.5 | 7.5 | No | pass |
| Example 2 | 1.1 | 1.2 | 8 | 7.5 | Yes | 10 | 9.5 | Yes | pass |
| Example 3 | 0.9 | 0.7 | 8.75 | 8.75 | Yes | 10 | 7.5 | No | pass |
| Example 4 | 1 | 0.7 | 8.5 | 7.5 | Yes | 10 | 5 | Yes | pass |
| Example 5 | 0.5 | 1 | 10 | 2.5 | Yes | 10 | 1.5 | No | pass |
| Comparative Example 1 | 3.3 | 2 | 9 | 8.25 | Yes | 10 | 7.5 | No | pass |
| Comparative Example 2 | 1 | 1.3 | 9.5 | 7.8 | Yes | 10 | 7.5 | No | pass |
| Comparative Example 3 | 1.7 | 1.3 | 9 | 7.8 | Yes | 8.5 | 8.5 | Yes | fail |
| Comparative Example 4 | 1.3 | 1 | 9.75 | 5 | Yes | 9.5 | 8 | Yes | fail |
| Comparative Example 5 | 7.8 | 14.1 | 10 | 8.25 | Yes | 9 | 9 | Yes | fail |
| Comparative Example 6 | 1.3 | 9.8 | 10 | 8.25 | No | 9 | 10 | Yes | fail |

(58) Field of Classification Search
USPC ........ 523/161; 524/186, 251, 252, 366, 375, 524/376, 386, 388, 401
See application file for complete search history.

(56) References Cited

FOREIGN PATENT DOCUMENTS

| | | |
|---|---|---|
| EP | 1101805 A1 | 5/2001 |
| EP | 3502197 A1 | 6/2019 |
| JP | H06313144 A | 11/1994 |
| JP | H07196972 A | 8/1995 |
| JP | 3017031 U | 10/1995 |
| JP | H09302298 A | 11/1997 |
| JP | 3078172 B2 | 8/2000 |
| JP | 2001139866 A | 5/2001 |
| JP | 2001294798 A | 10/2001 |
| JP | 2003103988 A | 4/2003 |
| JP | 2005081624 A | 3/2005 |
| JP | 2016017105 A | 2/2016 |
| JP | 2016117828 A | 6/2016 |
| JP | 2021507950 A | 2/2021 |
| WO | 0216515 A1 | 2/2002 |
| WO | 2010052729 A1 | 5/2010 |

\* cited by examiner

| Example | Seepage 23°C 24h storage | Seepage 1 week storage 40°C/80% RH | Machine writing cleanliness | Machine writing regularity | Complete ink restitution | Hand writing cleanliness | Hand writing regularity | Gooping | Drop test without follower |
|---|---|---|---|---|---|---|---|---|---|
| Example 1 | 1.1 | 1 | 10 | 8.5 | Yes | 9.5 | 7.5 | No | pass |
| Example 2 | 1.1 | 1.2 | 8 | 7.5 | Yes | 10 | 9.5 | Yes | pass |
| Example 3 | 0.9 | 0.7 | 8.75 | 8.75 | Yes | 10 | 7.5 | No | pass |
| Example 4 | 1 | 0.7 | 8.5 | 7.5 | Yes | 10 | 5 | Yes | pass |
| Example 5 | 0.5 | 1 | 10 | 2.5 | Yes | 10 | 1.5 | No | pass |
| Comparative Example 1 | 3.3 | 2 | 9 | 8.25 | Yes | 10 | 7.5 | No | pass |
| Comparative Example 2 | 1 | 1.3 | 9.5 | 7.8 | Yes | 10 | 7.5 | No | pass |
| Comparative Example 3 | 1.7 | 1.3 | 9 | 7.8 | Yes | 8.5 | 8.5 | Yes | fail |
| Comparative Example 4 | 1.3 | 1 | 9.75 | 5 | Yes | 9.5 | 8 | Yes | fail |
| Comparative Example 5 | 7.8 | 14.1 | 10 | 8.25 | Yes | 9 | 9 | Yes | fail |
| Comparative Example 6 | 1.3 | 9.8 | 10 | 8.25 | No | 9 | 10 | Yes | fail |

WRITING GEL INK FOR PENS WITHOUT FOLLOWER

CROSS REFERENCE TO RELATED APPLICATION

This application is a National Stage Application of International Application No. PCT/EP2021/054852, filed on Feb. 26, 2021, now published as WO 2021/170810 A1 and which claims priority from European Application No. 20315026.3, filed on Feb. 28, 2020.

FIELD OF THE PRESENT DISCLOSURE

The present disclosure concerns the field of writing instruments, in particular pens such as ball-pens, and writing ink for use in such writing instruments.

BACKGROUND OF THE PRESENT DISCLOSURE

Conventionally, ball pen inks are Newtonian high viscosity solvent based inks. Due to the use of glycols solvents of low volatility, ball pen inks are very stable during storage since the ink does not dry. Therefore, such inks can be used in pens without point protection. While such glycols solvent-based systems are desirable, they are typically also endowed with high shear viscosity. Again, high shear viscosity is per se not an undesirable property since it helps avoiding static leakage. Static leakage corresponds to the ink drop formation on the point when the pen is stored pointing downwards, especially in hot and humid condition. In a Newtonian system, the high shear viscosity also correlates with a viscosity at rest, and, thus, helps in reducing the problem of settling out of pigments and other solids which may clog the pen point. However, with high shear viscosities, the writing experience is not as smooth as the consumer would want. It turned out that balancing these properties was exceedingly difficult.

In order to solve these problems, the formulator turned to gel inks. Gel inks have a pseudoplastic rheological profile. In general gel inks are water based. They are a good compromise between low static leakage, smoothness and particles stabilization. However, they still suffer from several drawbacks:

Water is a light and volatile solvent. When stored without point protection (cap or hotmelt), the ink in the point can dry and clog the point. Moreover, the cap-off time of gel-ink based pens was found to be much lower as cap-off time of glycol-based ball pens.

Despite the use of corrosion inhibitors, water-based inks remain corrosive fluids. It is therefore impossible to use brass points and it is mandatory to use stainless steel points which are quite expensive materials and difficult to manufacture due to material hardness.

Furthermore, with water being a bad lubricant, it is also mandatory to use points with strong flow. For typical pens, it was found that the flow of a ball pen with a water-based ink could not be lowered to less than about 300 mg/200 m. This compares unfavorably to a glycol-based ink with about 35 mg/200 m. As a result, the mileage (i.e. total length of writing of the pen) of water-based ink pens is much lower than the mileage of glycol-based inks pens.

Glycol-based inks, or more generally solvent-based inks, for ball pens have also been described in the prior art. In particular, JP3078172 and JPH07-196972 describe the use of fatty acid amide wax in an oily ink composition as a thixotropic agent. However, use of fatty amid waxes alone is not sufficient to avoid the static leakage of the ink. In WO 2019/122017 A1, this technical problem is addressed by using a combination of fatty acid amide wax and silica particles are used as the gelling agent.

However, there is still room for further improvement of solvent-based inks for pens, in particular when it comes to balancing the rheological properties of the ink to achieve both excellent writing performance and avoiding leakage of the ink from the pen both after dynamic situations (e.g. by draining the ink from the cartridge during writing) and after static situations (e.g. storing the pen on a shelf or storing the pen under heat and humidity such as encountered when keeping the pen close to the human body in a pocket).

Another issue associated with balancing rheology properties is that the ink contained in the pen's cartridge should not accidentally move upon being shocked by e.g. dropping the pen from some height. The forces exerted on the ink when a falling pen hits the ground are short in duration but substantial and the ink reservoir may split into multiple distinct reservoirs which may disrupt or starve the continuous flow of the ink during writing. This problem also depends on the cartridge's geometry since thinner cartridges are subject to different capillary forces and surface tension of the cartridge's inner wall surfaces. The issue of drops causing reservoir splitting may be ameliorated by providing the cartridge with a so-called follower. A follower is a viscous but flowable composition provided at the rear end of the ink reservoir in the cartridge. It is primarily provided to prevent the ink from exiting the open rear end of the cartridge. Thus, the follower's action can be likened to the action of a movable plug. However, the follower may also have further functions such as preventing the splitting of the reservoir (by denying the ink empty space within the reservoir into which it can expand in response to the pen being dropped). While an acceptable solution, the addition of a follower is a further manufacturing step and adds cost. In addition, there is a risk that the follower mixes with the ink at elevated temperatures and that of migration of colorant into the follower giving the pen the impression that is fuller than it actually is. Thus, not using a follower may be desirable.

SUMMARY OF THE PRESENT DISCLOSURE

The present inventors have surprisingly found that specific non-aqueous writing ink compositions do not require the use of a follower in specific tubular cartridges, in particular for preventing the aforementioned splitting of the ink reservoir upon drops of the writing instrument.

In a first aspect, the present disclosure relates to a writing instrument. The writing instrument may be a pen, in particular a ball-pen. The writing instrument may comprise a tubular ink cartridge. The tubular ink cartridge may have an inner diameter of between about 1 mm and about 2.5 mm and two open ends. The first open end of the tubular ink cartridge may be connected with the writing tip. The second open end of the tubular ink cartridge may be connected with the external surroundings of the writing instrument.

The writing instrument may comprise a non-aqueous writing ink. The non-aqueous writing ink may comprise a solvent, a resin, a coloring agent, and a gelling agent. The gelling agent may comprise a mixture of silica particles and of a fatty acid amide wax. The resin may be used in amounts of above about 3 wt.-%, relative to the total weight of the ink.

In some embodiments, the resin may be selected from polyester resins, polyurethane resins, ketone resins, ether resins, and mixtures thereof. In some embodiments, the resin may be present in an amount of between about 3 and about 30%, specifically between about 3 and about 25%, and in particular between about 5 to about 20%, relative to the total weight of the ink.

In some embodiments, the non-aqueous writing ink may comprise a homo or copolymer of vinylpyrrolidone. In some embodiments, the homo or copolymer of vinylpyrrolidone may advantageously comprise a polyvinylpyrrolidone. In some embodiments, the homo or copolymer of vinylpyrrolidone may be present in amounts of between about 0.05 and about 0.8 wt.-%, more specifically between about 0.1 and about 0.6 wt.-%, in particular between about 0.15 and about 0.5 wt.-%, relative to the total weight of the ink.

In some embodiments, the homo or copolymer of vinylpyrrolidone may be polyvinylpyrrolidone having a weight-average molecular weight of above about 200 kDa, specifically between about 400 and about 2300 kDa, more specifically between about 450 and about 2000 kDa, and in particular between about 600 and about 1900 kDa.

In some embodiments, the amount by weight of the homo or copolymer of vinylpyrrolidone, in particular polyvinylpyrrolidone, may be lower than the amount by weight of the mixture of silica particles and of fatty acid amide wax.

In some embodiments, the silica particles may comprise hydrophilic silica particles. In some embodiments, the hydrophilic silica particles may be present in an amount of between about 0.10 and about 0.60 wt.-%, relative to the total weight of the ink.

In some embodiments, the fatty acid amide wax may comprise an N,N'-ethylene-bis-fatty acid amide. In some embodiments, it may be advantageous that the fatty acid amide wax may comprise an octadecanamide of the following formula (I)

In some embodiments, the gelling agent may be present in amounts of between about 0.1 and about 1.2 wt.-%, more specifically between about 0.15 and about 0.60 wt.-%, relative to the total weight of the ink.

In some embodiments, the solvent may be selected from the group consisting of glycol ethers, alcohols, and mixture thereof. It may be advantageous that the solvent is selected from polyethylene glycol ethers, polypropylene glycol ethers, phenoxyethanol, 1-phenoxy-2-propanol, or mixtures thereof.

In some embodiments, the solvent may be present in amounts of between about 35 and about 80 wt.-%, relative to the total weight of the ink. In some embodiments, it may be advantageous that the solvent is present in amounts between about 45 and about 75 wt.-%, relative to the total weight of the ink.

In some embodiments, the coloring agent may be a dye, in particular a dye selected from the group consisting of azoic dyes, triarylmethane dyes, phthalocyanine derivatives dyes, xanthene dyes and mixture thereof.

In some embodiments, the coloring agent may be present in amounts of between about 5 and about 30 wt.-%, in particular between about 7 and about 28 wt.-%, relative to the total weight of the ink.

In some embodiments, the non-aqueous writing ink may further comprise one or more additives. In some embodiments, the additive may be a further gelling agent. In some embodiments, it may be advantageous that the non-aqueous writing ink further comprises one or more additives selected from the group consisting of thickening agents, clear drain agents, viscosity imparting agents, lubricants, dispersing agents and mixtures thereof.

In some embodiments, the non-aqueous writing ink may comprise in amounts relative to the total weight of the ink: between about 0.1 and about 0.6 wt.-% polyvinylpyrrolidone having a weight-average molecular weight of between about 450 and about 2000 kDa; between about 0.15 and about 0.60 wt.-% of the fatty acid amide wax; and between about 0.15 and about 0.60 wt.-% hydrophilic silica.

In some embodiments, the non-aqueous writing ink may comprise a resin selected from polyester resins, polyurethane resins, ketone resins, ether resins, and mixtures thereof. It may be advantageous that the resin is a ketone resin. Additionally or alternatively, the resin may be present in an amount of between about 3 and about 30%, specifically between about 3 and about 25%, and in particular between about 5 to about 20%, relative to the total weight of the ink. Alternatively, the ink may comprise between about 55 and about 75 wt.-% of 1-phenoxy-2-propanol. It may also be advantageous that fatty acid amide wax of the non-aqueous writing ink comprises an N,N'-ethylene-bis-fatty acid amide, in particular an octadecanamide of the following formula (I)

In some embodiments, the ink may have a loss factor tan δ at rest of between about 3 and about 15, more specifically between about 4 and about 12, and in particular between about 5 and about 10. Additionally or alternatively, the ink may have a loss factor after shear of between about 8 and about 60, more specifically between about 11 and about 50, and in particular between about 15 and about 40.

In some embodiments, the non-aqueous writing ink may consist of the following components in amounts relative to the total weight of the ink: about 55 to about 75 wt.-% of the solvent is selected from a polyethylene glycol ether, a polypropylene glycol ether, phenoxyethanol, 1-phenoxy-2-propanol, or mixtures thereof; about 10 to about 30 wt.-% of the coloring agent; about 0.10 to about 0.60 wt.-% polyvinylpyrrolidone having a weight-average molecular weight of between about 600 and about 1900 kDa; about 0.15 to about 0.60 wt.-% fatty acid amide wax; about 0.15 to about 0.60 wt.-% hydrophilic silica; and the remainder of components being selected from resins and additives.

In some embodiments, the non-aqueous writing ink may comprise or may consist of the following components in amounts relative to the total weight of the ink: about 55 to about 75 wt.-% of the 1-phenoxy-2-propanol; about 10 to about 30 wt.-% of the coloring agent; about 0.10 to about 0.60 wt.-% polyvinylpyrrolidone having a weight-average molecular weight of between about 600 and about 1900 kDa; about 0.15 to about 0.60 wt.-% fatty acid amide wax comprising a N,N'-ethylene-bis-fatty acid amide, in particular a N,N'-ethylene-bis-fatty acid amide having the following formula (I)

(I)

about 0.15 to about 0.60 wt.-% hydrophilic silica; about 5 to about 15 wt.-% of a resin; and the remainder of components being additives, in particular the additives defined above.

In a second aspect, the present disclosure relates to a process of preparing the writing instrument according to the first aspect of the present disclosure. The non-aqueous writing ink may be prepared by the following steps: a) Forming a first premix comprising silica particles in a solvent. The temperature in this step may be between about 30 and about 70° C. The first premix may be mixed with a shear rate of between about 20 and about 25 m/s b) Combining the first premix with the remainder of the components of the non-aqueous writing ink.

In some embodiments, the non-aqueous writing ink may be prepared by the following steps: a) Forming a first premix comprising silica particles in a solvent. The temperature in this step may be between about 30 and about 70° C. The first premix may be mixed with a shear rate of between about 20 and about 25 m/s. b) Forming a second premix comprising fatty acid amide wax in a solvent. The temperature in this step may be between about 30 and about 70° C. The second premix may be mixed with a shear rate of between about 20 and about 25 m/s. c) Combining the first and second premixes with the remainder of the components of the non-aqueous writing ink.

The embodiments recited for the above first aspect of the disclosure are equally combinable with the aforementioned second aspect of the disclosure.

DETAILED DESCRIPTION OF THE PRESENT DISCLOSURE

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

In a first aspect, the present disclosure relates to a writing instrument. The writing instrument may be a pen, in particular a ball-pen. The writing instrument may comprise a tubular ink cartridge. The tubular ink cartridge may have an inner diameter of between about 1 mm and about 2.5 mm, more specifically between about 1.2 mm and about 2.0 mm, more specifically between about 1.4 mm and about 1.8 mm. The tubular ink cartridge may further have two open ends. The first open end of the tubular ink cartridge may be connected with the writing tip. The overall pen may be configured such that the ink can exit the tubular ink cartridge through the first open end to be provided to the writing tip. The second open end of the tubular ink cartridge may be connected with the external surroundings of the writing instrument. Alternatively, the second open end of the tubular ink cartridge may be in fluid communication with the exterior of the tubular ink cartridge. Alternatively, the tubular ink cartridge may be configured such that ink or another reference liquid contained within the tubular ink cartridge can exit the cartridge through the second open end of the tubular ink cartridge. Alternatively, the tubular ink cartridge may not contain a follower. Alternatively, the tubular ink cartridge may not contain a flowable composition which is located between the ink reservoir contained in the tubular ink cartridge and its second open end. Alternatively, the filling of the tubular ink cartridge may consist of the non-aqueous writing ink and air.

The writing instrument may comprise a non-aqueous writing ink. In this context, non-aqueous means that the ink does not comprise water as a solvent for dyes/pigments and/or may be substantially free (e.g. containing less than about 2 wt.-% with respect to the total weight of the ink) or free of water.

The non-aqueous writing ink may comprise a solvent, a resin, a coloring agent, and a gelling agent. The gelling agent may comprise a mixture of silica particles and of a fatty acid amide wax. The resin may be used in amounts of above about 3 wt.-%, more specifically above about 4 wt.-%, in particular above about 5 wt.-%, relative to the total weight of the ink.

The non-aqueous writing ink may comprise a resin. The resin may impart viscosity to the ink and/or may act as a binder. It may be a natural or synthetic resin. The resin may comprise a polyester resin; a polyurethane resin; a ketone resin such as a ketone-formaldehyde resin such as an acetophenone-formaldehyde modified resin; an ether resin; a vinyl resin, such as a vinyl chloride copolymer, polyvinyl butyral, a polyvinyl acetate, vinyl acetate copolymer, or a polyvinyl alcohol resin; an acrylic resin; a styrene-acrylic resin; a styrene-maleic acid copolymer resin; a rosin-maleic acid copolymer resin; a phenol resin; a cellulosic resin; an amid resin, an alkyd resin, a rosin-modified resin, a rosin-modified phenol resin; a xylene resin; a polyacetal resin; a terpene resin; a phenoxy resin; or a mixture thereof. In some embodiments, it may be advantageous that the resin selected from polyester resins, polyurethane resins, ketone resins, ether resins, and mixtures thereof. It may be particularly advantageous that the resin is a ketone resin.

In some embodiments, the resin may be present in an amount of between about 3 and about 30%, specifically between about 3 and about 25%, and in particular between about 5 to about 20%, relative to the total weight of the ink.

The non-aqueous writing ink may comprise a gelling agent. The gelling agent may comprise a mixture of silica particles and of a fatty acid amide wax. It should be understood that the presence of further gelling agents is not excluded and that one or more further gelling agents can be optionally added to the ink. The term "mixture" is not particularly limited and is intended to refer to any combination comprising silica particles and a fatty acid amide wax. In some embodiments, it may be advantageous to premix the silica particles and of a fatty acid amide wax. Suitable processes for doing this will be elaborated further below.

In some embodiments, the silica particles may comprise silica particles. It may be advantageous that the silica particles are hydrophilic silica particles. It may be advantageous that the silica particles are fumed silica particles, in particular hydrophilic fumed silica particles, such as the product sold by Evonik under the trade name AEROSIL® 200.

In some embodiments, the non-aqueous writing ink may comprise dispersed silica particles or silica-based gel-like particles wherein the average particle size is less than about 1 μm, specifically less than about 0.9 μm, in particular less than about 0.8 μm using dynamic light scattering (DLS) such as Malvern Zetasizer ZS.

The use of fatty acid amide waxes is well-established in the art as i.a. rheology-modifying agents. Suitable fatty acid residues may include aliphatic carboxylic acids having more than about 6 carbon atoms, in particular about 6 to about 24 carbon atoms, or about 6 to about 18 carbon atoms. The aliphatic carboxylic acids may optionally be substituted, in particular with hydroxyl groups. Examples of suitable fatty acid residues include residues derived from caprylic acid, capric acid, lauric acid, myristic acid, palmitic acid, stearic acid, hydroxystearic acid, arachidic acid, and behenic acid.

In some embodiments, the fatty acid amide wax is a fatty acid diamide wax. The fatty acid diamide wax may comprise a fatty acid diamide comprising two fatty acid residues of about 6 or more carbon atoms, in particular of about 6 to about 24 carbon atoms, or about 6 to about 18 carbon atoms, which may optionally be substituted, in particular with hydroxyl groups. It may be advantageous that the fatty acid diamide wax comprises an N,N'-alkylene moiety having between 1 and about 12 carbon atoms, in particular between 1 and about 6 carbon atoms, in particular between about 2 to about 4 carbon atoms. It may be particularly advantageous that the fatty acid diamide wax comprises an N,N'-ethylene-bis-fatty acid amide, in particular wherein the two fatty acid residues independently of each other comprise about 6 or more carbon atoms, in particular about 6 to about 24 carbon atoms, or about 6 to about 18 carbon atoms. Each of the fatty acid residues may further and independently from each other be substituted, in particular with hydroxyl groups.

In some embodiments, it may be advantageous that the fatty acid amide wax may comprise 12-hydroxy-N-[2-[(1-oxooctyl)amino]ethyl]octadecanamide; N,N'-1,2-ethylene bis(12-hydroxy-octadecanamide); N,N'-1,2-ethylene bis(12-hydroxyoctadecanamide); N,N'-ethylene bis(12-hydroxystearamide); N,N'-ethylene bis(caprylamide), or mixtures thereof.

In some embodiments, it may be advantageous that the fatty acid amide wax may comprise an octadecanamide of the following formula (I)

(I)

In some embodiments, the gelling agent may be present in amounts of between about 0.1 and about 1.2 wt.-%, more specifically between about 0.15 and about 0.60 wt.-%, relative to the total weight of the ink.

In some embodiments, the hydrophilic silica particles may be present in an amount of between about 0.10 and about 0.60 wt.-%, relative to the total weight of the ink.

In some embodiments, the fatty acid amide wax may be present in an amount of between about 0.10 and about 0.60 wt.-%, relative to the total weight of the ink.

The non-aqueous writing ink may comprise a solvent. The term "solvent" is not intended to be particularly limiting and also includes i.a. a medium which disperses or suspends solid components such as pigments. In some embodiments, the solvent may be selected from the group consisting of glycol ethers, alcohols, and mixture thereof. It may be advantageous that the solvent is selected from polyethylene glycol ethers, polypropylene glycol ethers, phenoxyethanol, 1-phenoxy-2-propanol, or mixtures thereof. In some embodiments, the alcohol is a alcohol having a high boiling point such as boiling point of above about 130° C., above about 150° C., or above about 200° C. In some embodiments, the alcohol may be selected form the group consisting of benzyl alcohol, ethylene glycol, diethylene glycol, propylene glycol, dipropylene glycol, trimethylene glycol, glycerin, and mixtures thereof. It may be particularly advantageous that the alcohol is benzyl alcohol. In another embodiment the solvent may be a glycol ether having a high boiling point such as boiling point of above about 130° C., above about 150° C., or above about 200° C. It may be advantageous that the glycol ether is selected from the group consisting of diethylene glycol monoethyl ether, diethylene glycol mono butyl ether, dipropylene glycol monobutyl ether, tripropylene glycol monomethyl ether, phenoxyethanol, phenoxypropanol, and mixtures thereof. It may be particularly advantageous that the glycol ether is selected from the group consisting of phenoxyethanol, 1-phenoxy-2-propanol and mixture thereof.

In some embodiments, the solvent may be present in amounts of between about 35 and about 80 wt.-%, relative to the total weight of the ink. In some embodiments, it may be advantageous that the solvent is present in amounts between about 45 and about 75 wt.-%, relative to the total weight of the ink.

In some embodiments, it may be advantageous that the ink comprises between about 55 and about 75 wt.-% of 1-phenoxy-2-propanol.

In some embodiments, the coloring agent may be a dye, a pigment, or mixtures thereof, in particular a dye or pigment selected from the group consisting of azoic dyes, triarylmethane dyes, phthalocyanine derivative dyes, xanthene dyes and mixture thereof. In some embodiments, the colorant may be a pigment.

Examples of a dye usable in the ink according to the present disclosure include the following: VARIFAST Black 3806 (C.I. Solvent Black 29), 3807 (trimethyl benzyl ammonium salt of C.I. Solvent Black 29), Spirit Black SB (C.I. Solvent Black 5), SPIRON Black GMH (C.I. Solvent Black 43), Solvent Black 46 (salt forming from of C.I. Basic Violet 3 and Acid Yellow 36), VARIFAST Red 1308 (salt forming form of C.I. Basic Red 1 dye and C.I. Acid Yellow 23 dye), Solvent Red 49, VARIFAST Yellow AUM (salt forming form of C.I. Basic Yellow 2 dye and C.I. Acid Yellow 42 dye), SPIRON Yellow C2 GH (organic acid salt of C.I. Basic Yellow 2), SPIRON Violet CRH (C.I. Solvent Violet 8-1), VARIFAST Violet 1701 (salt forming form of C.I. Basic Violet 1 and C.I. Acid Yellow 42 dye), SPIRON Red CGH (organic acid salt of C.I. Basic Red 1), SPIRON Pink BH (C.I. Solvent Red 82), Nigrosine Base EX (C.I. Solvent Black 7), Oil Blue 613 (C.I. Solvent Blue 5), and Neozapon Blue 808 (C.I. Solvent Blue 70).

In some embodiments, the coloring agent may be a dye and can be selected from also a salt-forming dye and mixtures thereof, such as: Solvent Black 46 (salt forming from of C.I. Basic Violet 3 and Acid Yellow 36), VARIFAST Red 1308 (salt forming form of C.I. Basic Red 1 dye and C.I. Acid Yellow 23 dye), VARIFAST Yellow AUM (salt forming form of C.I. Basic Yellow 2 dye and C.I. Acid Yellow 42 dye), VARIFAST Violet 1701 (salt forming form of C.I. Basic Violet 1 and C.I. Acid Yellow 42 dye).

Examples of a pigments usable in the ink according to the present disclosure include organic, inorganic and processed pigments. Thus, the pigment may for example be an inorganic pigment such as a carbon black, ultramarine and titanium dioxide pigment, an organic pigment such as an azo-based pigment, phthalocyanine-based pigment, indigo pigment, thioindigo pigment, thren-based pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a metal pigment such as an aluminum powder or aluminum powder whose surface is treated with a colored resin, a metal gloss pigment obtained by forming a metal vapor deposition film such as that of aluminum on a transparent or colored transparent film, a metal pigment having a thickness of about 0.01 to about 0.1 μm obtained by peeling a metal vapor deposition film such as that of aluminum formed on a substrate such as a film, a colloidal particle having a mean particle size of about 5 to about 30 nm selected from gold, silver, platinum and copper, a fluorescent pigment, light-storing pigment, pearl pigment obtained by coating the surface of a core which is a naturally occurring mica, synthetic mica, glass flake, alumina and transparent film with a metal oxide such as titanium oxide, and the like.

In some embodiments, the coloring agent may be present in amounts of between about 5 and about 30 wt.-%, in particular between about 7 and about 28 wt.-%, relative to the total weight of the ink.

In some embodiments, the non-aqueous writing ink may comprise a homo or copolymer of vinylpyrrolidone. In some embodiments, the homo or copolymer of vinylpyrrolidone may advantageously comprise a polyvinylpyrrolidone. In some embodiments, it may be advantageous that the homo or copolymer of vinylpyrrolidone is present in amounts of between about 0.05 and about 0.8 wt.-%, more specifically between about 0.1 and about 0.6 wt.-%, and in particular between about 0.15 and about 0.5 wt.-%, relative to the total weight of the ink.

In some embodiments, the homo or copolymer of vinylpyrrolidone may have a weight-average molecular weight of above about 200 kDa, specifically between about 400 and about 2300 kDa, more specifically between about 450 and about 2000 kDa, and in particular between about 600 and about 1900 kDa.

In some embodiments, the amount by weight of the homo or copolymer of vinylpyrrolidone, in particular polyvinylpyrrolidone, may be lower than the amount by weight of the mixture of silica particles and of fatty acid amide wax.

In some embodiments, the non-aqueous writing ink may further comprise one or more additives. In some embodiments, the additive may be a further gelling agent. In some embodiments, it may be advantageous that the non-aqueous writing ink further comprises one or more additives. In some embodiments, the additives may be selected from the group consisting of thickening agents, clear drain agents, viscosity imparting agents, lubricants, dispersing agents and mixtures thereof.

In some embodiments, the non-aqueous writing ink may comprise in amounts relative to the total weight of the ink: between about 0.1 and about 0.6 wt.-% polyvinylpyrrolidone having a weight-average molecular weight of between about 450 and about 2000 kDa; between about 0.15 and about 0.60 wt.-% of the fatty acid amide wax; and between about 0.15 and about 0.60 wt.-% hydrophilic silica.

In some embodiments, the non-aqueous writing ink may comprise or consist of the following components in amounts relative to the total weight of the ink: about 55 to about 75 wt.-% of the solvent is selected from a polyethylene glycol ether, a polypropylene glycol ether, phenoxyethanol, 1-phenoxy-2-propanol, or mixtures thereof; about 10 to about 30 wt.-% of the coloring agent; about 0.10 to about 0.60 wt.-% polyvinylpyrrolidone having a weight-average molecular weight of between about 600 and about 1900 kDa; about 0.15 to about 0.60 wt.-% fatty acid amide wax; about 0.15 to about 0.60 wt.-% hydrophilic silica; and the remainder of components being selected from the resins and additives.

In some embodiments, the non-aqueous writing ink may comprise or may comprise or consist of the following components in amounts relative to the total weight of the ink: about 55 to about 75 wt.-% of the 1-phenoxy-2-propanol; about 10 to about 30 wt.-% of the coloring agent; about 0.10 to about 0.60 wt.-% polyvinylpyrrolidone having a weight-average molecular weight of between about 600 and about 1900 kDa; about 0.15 to about 0.60 wt.-% fatty acid amide wax comprising a N,N'-ethylene-bis-fatty acid amide, in particular a N,N'-ethylene-bis-fatty acid amide having the following formula (I)

about 0.15 to about 0.60 wt.-% hydrophilic silica; about 5 to about 15 wt.-% of resin; and the remainder of components being additives, in particular the additives defined above.

In some embodiments, the non-aqueous writing ink may have a viscosity at rest at about 20° C. of between about 30 000 cps and about 150 000 cps, more specifically between about 40 000 cps and about 120 000 cps, and in particular between about 50 000 cps and about 100 000 cps. The viscosity at rest may be measured at about 20° C. with a cone-and-plate rheometer such as a rheometer by Malvern Kinexus with a cone of about 40 mm and an angle of about 4° with a shear rate of 0.01 $s^{-1}$.

In some embodiments, the non-aqueous writing ink may have a viscosity under shear at about 100 $s^{-1}$ at about 20° C. of between about between about 1200 cps and about 10 000 cps, more specifically between about 1300 cps and about 5 000 cps, and in particular between about 1500 cps and about 4000 cps. The viscosity under shear may be measured at about 20° C. with a cone-and-plate rheometer such as a rheometer by Malvern Kinexus with a cone of about 40 mm and an angle of about 4° with a shear rate of 100 $s^{-1}$.

In some embodiments, the non-aqueous writing ink may have a loss factor tan δ at rest of between about 3 and about 15, more specifically between about 4 and about 12, and in particular between about 5 and about 10. The loss factor tan δ at rest may be measured at about 20° C. with a cone-and-plate rheometer such as a rheometer by Malvern Kinexus with a cone of about 40 mm and an angle of about 4° with an oscillation measurement (frequency=about 1 Hz, shear about 20 Pa).

In some embodiments, the non-aqueous writing ink may have a loss factor tan after shear of between about 8 and about 60, more specifically between about 11 and about 50, and in particular between about 15 and about 40. The loss factor tan δ after shear may be measured at about 20° C. with a cone-and-plate rheometer such as a rheometer by Malvern Kinexus with a cone of about 40 mm and an angle of about 4° with an oscillation measurement (frequency=about 1 Hz, shear about 20 Pa) after pre-shearing the sample (to simulate the writing process) for about 30 seconds at about 1000 $s^{-1}$.

In a second aspect, the present disclosure relates a process of preparing the writing instrument according to the first aspect of the present disclosure or a non-aqueous writing ink according to second aspect of the present disclosure. The process is not particularly limited.

Accordingly, in some embodiments, the non-aqueous writing ink may be prepared by the following steps: In one step, a first premix comprising silica particles in a solvent is formed. The temperature in this step may be between about 30 and about 70° C. The first premix may be mixed with a shear rate of between about 20 and about 25 m/s. In another step, a second premix comprising fatty acid amide wax in a solvent is formed. The temperature in this step may be between about 30 and about 70° C. It should be understood that the steps of forming the first premix can be performed with only a part of the solvent contained in the final writing ink. Then, the first premix may be combined with the remainder of the components of the writing ink.

However, in some embodiments, it may be advantageous that the fatty acid amide wax is activated by formation of a premix in a solvent (second premix), advantageously the solvent as described above for the ink, in particular a glycol ether, before its addition in the writing ink containing the (remainder of the) solvent and the coloring agent, the silica particles and optionally additives. Without wishing to be bound by theory, it is believed that such activation may allow the spreading of the fatty acid amide wax and therefore the obtaining of a stronger gel network. Advantageously the activation step (formation of a premix) may be carried out at a precise temperature and shear stress.

Accordingly, in some embodiments, the non-aqueous writing ink may be prepared by the following steps: In one step, a first premix comprising silica particles in a solvent is formed. The temperature in this step may be between about 30 and about 70° C. The first premix may be mixed with a shear rate of between about 20 and about 25 m/s. In another step, a second premix comprising fatty acid amide wax in a solvent is formed. The temperature in this step may be between about 30 and about 70° C. The second premix may be mixed with a shear rate of between about 20 and about 25 m/s. It should be understood that the steps of forming the first and second premixes can be performed with only a part of the solvent contained in the final writing ink. Then, the first and second premixes may be combined with the remainder of the components of the writing ink.

In order to obtain a premix, a rotor-stator disperser can be used. The activation of the fatty acid amide wax may be observed by measuring viscosity at rest of the premix. When activation is complete, viscosity at rest is maximal (spreading the fatty acid amide wax increases the viscosity at rest).

The embodiments recited for the above first aspect of the disclosure are equally combinable with the aforementioned second aspect of the disclosure.

In a third aspect, the present disclosure relates a non-aqueous writing ink, in particular for a writing instrument as defined in the first aspect of the present disclosure, wherein the non-aqueous writing ink may comprise a solvent, a resin, a coloring agent, and a gelling agent, and wherein the gelling agent may comprise a mixture of silica particles and a homo or copolymer of vinylpyrrolidone, in particular a polyvinylpyrrolidone.

The embodiments recited for the above first aspect of the disclosure are equally combinable with the aforementioned third aspect of the disclosure.

In the following the present disclosure will be further elaborated by way of Examples.

EXAMPLES

Measuring Methods
Measurements on inks and pens were carried out as follows:
1. Measurement of Rest Viscosity
The viscosity of the ink has been measured at 20° C. with a cone-and-plate rheometer Malvern Kinexus with a cone of 40 mm and an angle of 4° with a shear rate of 0.01 $s^{-1}$.

2. Measurement of Shear Viscosity

The viscosity of the ink has been measured at 20° C. with a cone-and-plate rheometer Malvern Kinexus with a cone of 40 mm and an angle of 4° with with a shear rate of 100 s$^{-1}$.

3. Determination of Shear Thinning Index

Mathematical formula: Shear thinning index=(Measurement of rest viscosity 0.01 s$^{-1}$ at 20° CP 4°/40 mm)/(Measurement of rest viscosity 100 s$^{-1}$ at 20° CP 4°/40 mm)

4. Measurement of Tan Delta at Rest

The measurement was performed with a cone-and-plate rheometer Malvern Kinexus with a cone of 40 mm and an angle of 4° and with an oscillation measurement (Frequency=1 Hz, Shear 20 Pa).

5. Measurement of Tan Delta after Shear at 1000 s$^{-1}$

The measurement was performed with a cone-and-plate rheometer Malvern Kinexus with a cone of 40 mm and an angle of 4° after pre-shearing the sample (to simulate the writing process) for about 30 seconds at about 1000 s$^{-1}$.

6. Seepage 23° C.—24 h Storage

This test measures the amount of ink that will leak from the point of a ball pen when it is stored pointing downwards for one day at 23° C. The process was as carried out as follows (test on 10 pens):

2. Ball pen start=make pen write to decrease its viscosity.
3. Wipe ink from the point with non fluffy paper
4. Store the Ball pen 24 hours point down at 23° C./50% RH
5. Transfer ink drop from the pen point to a paper. Rotate the point of each pen on the test sheet 360°, transferring any ink seepage to the test sheet.
6. Cover the seepage display with a strip of transparent tape
7. Spread the ink stain using a ceramic roulette to a circular stain.
8. Measurement of diameter of each stain (record the minimum diameter that incorporates the entire sport)
9. Calculate the average spot size (mm) from all 10 samples.

7. Seepage 1 Week Storage 40° C./80% RH

This test measures the amount of ink that will leak from the point of a ball pen when it is stored point down one week at 40° C./80% RH. The test simulates keeping the pen in pocket of shirt close to human body. The process was as carried out as follows (test on 10 pens):

10. Ball pen start=make pen write to decrease its viscosity.
11. Wipe ink from the point with non fluffy paper
12. Store the Ball pen 7 days point down @ 40° C./80% RH
13. Transfer ink drop from the pen point to a paper. Rotate the point of each pen on the test sheet 360°, transferring any ink seepage to the test sheet.
14. Cover the seepage display with a strip of transparent tape
15. Spread the ink stain using a ceramic roulette to a circular stain.
16. Measurement of diameter of each stain (record the minimum diameter that incorporates the entire sport)
17. Calculate the average spot size (mm) from all 10 samples.

18. Machine writing cleanliness

This test evaluates the machine write quality of pens under given test conditions during the first 20 meters of machine writing.

Equipment:
19. Air conditioned and humidity controlled room: 23° C.). (±2° 50% RH (±5%)
20. Writing machine operated according to the following guidelines:
  a) General Conditions:
    70° writing angle (0, +10)
    100 mm circle circumference
    Total weight pen/holder/additional weight: 140-160 grams
    ISO 12757 test paper
    Writing surface of polished stainless steel with felt underneath
  b) Machine Parameters:
    4.5 m/min writing speed (±0.5)
    0.6 mm spacing between circles (±0.2) on Minitek APC or position 5 on Mikron
    1 axial pen rotation per 100 circles
    Writing length: 20 meters
  c) Process:
    21. Place cartridges in barrels
    22. Draw loops to start pens
    23. Select the position with spacing 0.6 mm and record 20 meters over the counter
    24. Run the test by pressing the "pens rotation"
    25. Calculate average score on tested pens excluding pens which have not started.
    6. Evaluate the cleanliness i.e. more or less uniform thickness on the line (presence of stains)

9. Machine writing regularity

This test evaluates the machine write quality of pens under given test conditions during the first 20 meters of machine writing.

Equipment:
26. Air conditioned and humidity controlled room: 23° C.). (±2° 50% RH (±5%)
27. Writing machine operated according to the following guidelines:
  a) General conditions:
  b) 70° writing angle (0, +10)
  c) 100 mm circle circumference
  d) Total weight pen/holder/additional weight: 140-160 grams
  e) ISO 12757 test paper
  f) Writing surface of polished stainless steel with felt underneath
  b) Machine Parameters:
    4.5 m/min writing speed (±0.5)
    0.6 mm spacing between circles (±0.2) on Minitek APC or position 5 on Mikron
    1 axial pen rotation per 100 circles
    Writing length: 20 meters
  c) Process:
    28. Place cartridges in barrels
    29. Draw loops to start pens
    30. Select the position with spacing 0.6 mm and record 20 meters over the counter
    31. Run the test by pressing the "pens rotation"
    32. Calculate average score on tested pens excluding pens which have not started.
    33. Evaluate the regularity i.e. more or less uniform color when writing (presence of white in lines)

10. Complete Ink Restitution

This test reflects the "mileage" of a pen, i.e. the capacity of the pen to write until it stops writing.

Samples are marked "Yes" when the pen wrote until its cartridge was completely empty. Otherwise, the sample was marked as "No".

11. Handwriting Cleanliness

This test measures the uniformity in thickness of a written line. The regularity of the written line thickness was visually assessed and rated in intervals of 1. The rating scale was as follows:
   10: very clean, no excess, no stains,
   0: not clean, excess and ink stains on the written lines 12. Handwriting Regularity This test measures the uniformity of color when writing. The samples were visually inspected for lighter or darker areas and "channels" in the middle of a line. The rating scale was as follows, with intervals of 1:
   10: very regular, no white in the line,
   0: not regular 13. Gooping This test assesses whether ink drops from the point after manual writing. It is a visual assessment of the point after writing one sentence.

14. Drop Test without Follower

This test simulates the user dropping the pen onto the floor. The cartridges did not include a follower. The process and the assessment were carried out as follows:
   34. Cartridges are located in a body pen at 23° C./50% RH. The points are not retracted and point up position.
   35. 10 drops/80 cm height (drop in a PVC pipe to avoid to chock the point on the floor)
   36. Visual assessment of ink column (no ink movement or splitting) after each drop
   37. After 10 drops, if ink column looks stable, validation by handwriting test (pen has to write properly).

Example 1

Following the procedure outlined for the second aspect of the disclosure, the following non-aqueous writing ink was prepared:

| Component | Primary Function | Content in wt. % |
|---|---|---|
| Tego Airex 900 | Defoamer | 0.05% |
| Solvent Red 49 | Dye | 2.5% |
| Solvent Black 46 at 50% in phenoxyethanol | Dye | 30% |
| Lonzest SOC | Additive (clear drain) | 1.3% |
| SK resin | Binder (Newtonian) | 12.5% |
| Aerosil 200 at 10% in 1-phenoxy-2-propanol | Silica (part of gelling system) | 4% |
| PVP K80 | Elastic agent | 0.15% |
| Crayvallac Super at 4% in 1-phenoxy-2-propanol | Fatty acid amide wax (part of gelling system) | 6.5% |
| 1-phenoxy-2-propanol | Solvent | Ad 100% |
| Total | | 100 |

The rheological properties of the ink according to Example 1 were as follows:
   a. Viscosity at rest=74990 cP
   b. Viscosity under shear=2765 cP
   c. Tan delta at rest=6.9
   d. Tan delta after shear=29.7

Examples 2 to 5 and Comparative Examples 1 to 6

Further non-aqueous writing inks were prepared as described for Example 1 with the only variable being the composition of the ink as indicated below. Dyes, defoamer, and clear drain additives remained unchanged. The prepared inks were injected into the cartridges. All experimental tests have been done on stabilized cartridges, i.e. after conditioning after injection for at least one week of storage at 23° C. and 50% RH. This time point is called T=0. The writing system is a retractable cartridge with a needle tip of 1 mm.

Below table 1 shows the compositions used, including Example 1 for reference:

| Example | SK resin (wt.-%) | KTR 123 resin (wt.-%) | Crayvallac Super (wt.-%) | PVP K80 (wt.-%) | Aerosil 200 (wt.-%) |
|---|---|---|---|---|---|
| Example 1 | 12.5 | 0 | 0.26 | 0.15 | 0.4 |
| Example 2 | 12.5 | 0.15 | 0.26 | 0 | 0.4 |
| Example 3 | 12.15 | 0 | 0.26 | 0.5 | 0.4 |
| Example 4 | 11.65 | 0 | 0.26 | 1 | 0.4 |
| Example 5 | 7.65 | 0 | 0.26 | 5 | 0.4 |
| Comparative Example 1 | 12.5 | 0 | 0.26 | 0.15 | 0 |
| Comparative Example 2 | 12.5 | 0 | 0 | 0.15 | 0.4 |
| Comparative Example 3 | 0 | 0 | 0.36 | 0.15 | 0.4 |

-continued

| Example | SK resin (wt.-%) | KTR 123 resin (wt.-%) | Crayvallac Super (wt.-%) | PVP K80 (wt.-%) | Aerosil 200 (wt.-%) |
|---|---|---|---|---|---|
| Comparative Example 4 | 0 | 0 | 0.36 | 0.7 | 0.4 |
| Comparative Example 5 | 0 | 0 | 0.46 | 0.15 | 0 |
| Comparative Example 6 | 0.7 | 0 | 0.42 | 0 | 0.4 |

Figure 1:
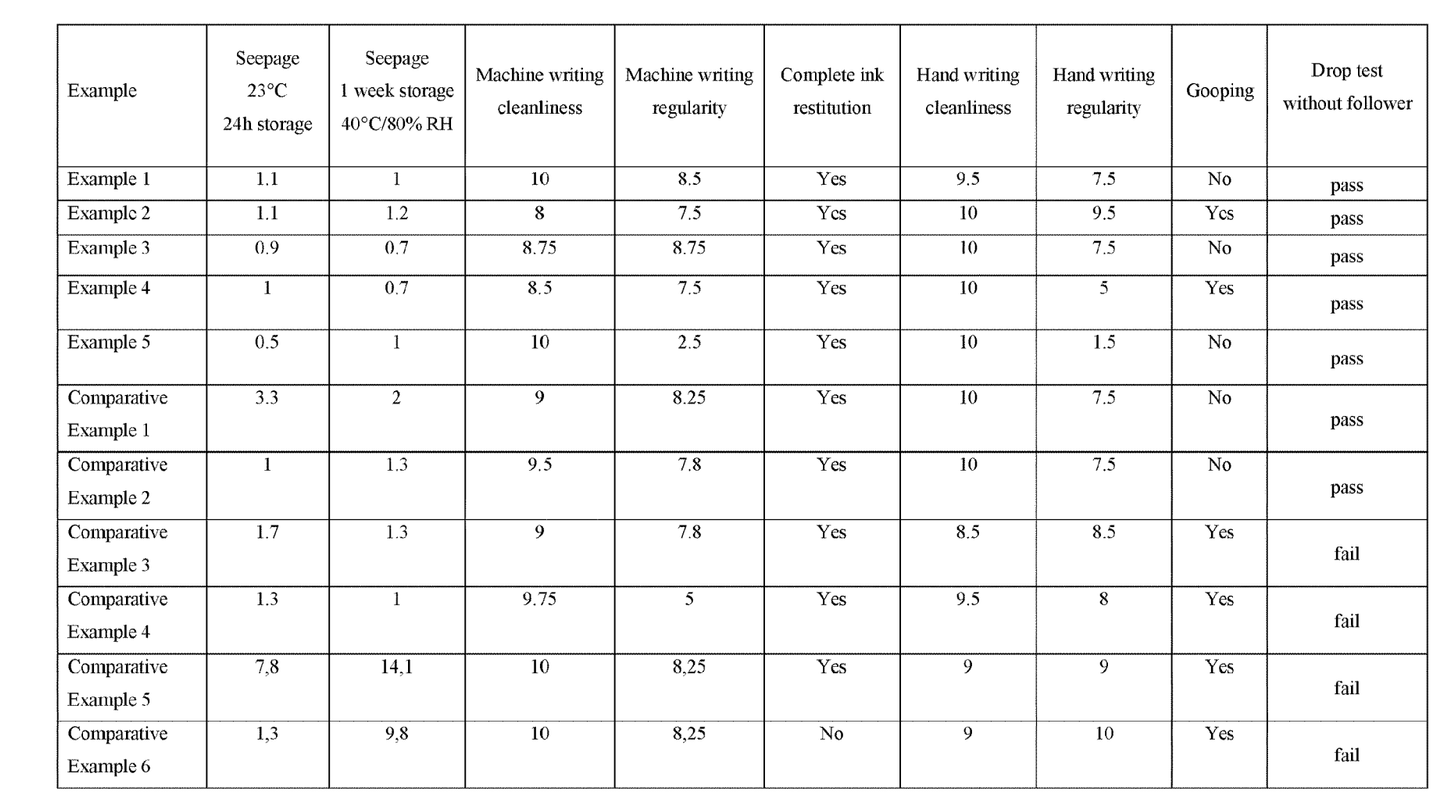
FIG. 1 summarizes the performance of Examples 1 to 5 and Comparative Examples 1 to 6

The performance of the Examples and the Comparative Examples is indicated in FIG. 1.

As evident from a comparison of the Comparative Examples and the Examples, a non-aqueous writing ink comprising a resin and a mixture of silica particles and of a fatty acid amide wax as a gelling agent provide very good results in the drop test while providing a very acceptable balance of other writing performance criteria. However, as evident from Comparative Example 6, this further depends on using a sufficient amount of resin. Comparative Example 1 did pass the drop test but showed unacceptable performance in both seep tests. The table in FIG. 1 further shows that overall performance is best when additionally a homo or copolymer of vinylpyrrolidone is used.

Although specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A writing instrument having a writing tip, the writing instrument comprising a non-aqueous writing ink which is contained in a tubular ink cartridge, wherein the tubular ink cartridge has an inner diameter of between 1 mm and 2.5 mm, a first open end, and a second open end, wherein the first open end is connected with the writing tip and the second open end is connected with external surroundings of the writing instrument,
wherein the non-aqueous writing ink contained in a tubular ink cartridge is in fluid communication with the writing tip via the first open end and with the external surroundings of the writing instrument via the second open end, and
wherein the non-aqueous writing ink comprises a solvent, a resin, a coloring agent, and a gelling agent, wherein the gelling agent comprises a mixture of silica particles and of a fatty acid amide wax, and wherein the resin is used in amounts of above 3 wt.-%, relative to a total weight of the ink.

2. The writing instrument of claim 1, wherein the resin is selected from polyester resins, polyurethane resins, ketone resins, ether resins, and mixtures thereof.

3. The writing instrument of claim 1, wherein non-aqueous writing ink comprises a homo or copolymer of vinylpyrrolidone, and wherein the homo or copolymer of vinylpyrrolidone is present in amounts of between 0.05 and 0.8 wt.-%, relative to the total weight of the ink.

4. The writing instrument of claim 3, wherein the vinylpyrrolidone is a polyvinylpyrrolidone having a weight-average molecular weight of above 200 kDa.

5. The writing instrument of claim 3, wherein an amount by weight of the homo or copolymer of vinylpyrrolidone is lower than the amount by weight of the mixture of silica particles and of the fatty acid amide wax.

6. The writing instrument of claim 1, wherein the silica particles comprise hydrophilic silica particles.

7. The writing instrument of claim 6, wherein the hydrophilic silica particles are present in an amount of between 0.10 and 0.60 wt.-%, relative to the total weight of the ink.

8. The writing instrument of claim 1, wherein the fatty acid amide wax comprises an N,N'-ethylene-bis-fatty acid amide.

9. The writing instrument of claim 1, wherein the gelling agent is present in amounts of between 0.1 and 1.2 wt.-%, relative to the total weight of the ink.

10. The writing instrument of claim 1, wherein the solvent is selected from the group consisting of glycol ethers, alcohols, and mixture thereof.

11. The writing instrument of claim 1, wherein the solvent is present in amounts of between 35 and 80 wt.-%, relative to the total weight of the ink.

12. The writing instrument of claim 1, wherein the coloring agent is a dye.

13. The writing instrument of claim 1, wherein the non-aqueous writing ink further comprises one or more additives selected from the group consisting of thickening agents, clear drain agents, viscosity imparting agents, lubricants, dispersing agents and mixture thereof.

14. The writing instrument of claim 1, wherein the non-aqueous writing ink comprises in amounts relative to the total weight of the ink:
between 0.1 and 0.6 wt.-% polyvinylpyrrolidone having a weight-average molecular weight of between 450 and 2000 kDa;
between 0.15 and 0.60 wt.-% of the fatty acid amide wax; and
between 0.15 and 0.60 wt.-% hydrophilic silica.

15. The writing instrument of claim 14, wherein the ink comprises between 55 and 75 wt.-% of 1-phenoxy-2-propanol.

16. The writing instrument of claim 1, wherein the ink has a loss factor tan δ at rest of between 3 and 15, and/or or a loss factor after shear of between 8 and 60.

17. The writing instrument of claim 1, wherein the non-aqueous writing ink consists of the following components in amounts relative to the total weight of the ink:
55 to 75 wt.-% of the solvent, wherein the solvent is selected from a polyethylene glycol ether, a polypropylene glycol ether, phenoxyethanol, 1-phenoxy-2-propanol, or mixtures thereof;
10 to 30 wt.-% of the coloring agent;
0.10 to 0.60 wt.-% polyvinylpyrrolidone having a weight-average molecular weight of between 600 and 1900 kDa;
0.15 to 0.60 wt.-% fatty acid amide wax;
0.15 to 0.60 wt.-% hydrophilic silica;
and a remainder of components being selected from resins and additives.

18. The writing instrument of claim 17, wherein the non-aqueous writing ink comprises the following components in amounts relative to the total weight of the ink:

55 to 75 wt.-% of the 1-phenoxy-2-propanol;
10 to 30 wt.-% of the coloring agent;
0.10 to 0.60 wt.-% polyvinylpyrrolidone having a weight-average molecular weight of between 600 and 1900 kDa;
0.15 to 0.60 wt.-% fatty acid amide wax, wherein the fatty acid amide wax comprises a N,N'-ethylene-bis-fatty acid amide;
0.15 to 0.60 wt.-% hydrophilic silica;
5 to 15 wt.-% of the resins; and
the remainder of components being additives.

19. A process of preparing the writing instrument of claim 1, wherein the non-aqueous writing ink is prepared by:
 a) forming a first premix comprising silica particles in a solvent at a temperature of between 30 and 70° C. with a shear rate of between 20 and 25 m/s;
 b) combining the first premix with a remainder of the components of the non-aqueous writing ink.

20. The writing instrument of claim 1, wherein the fatty acid amide wax comprises an octadecanamide of the following formula (I)

* * * * *

UNITED STATES PATENT AND TRADEMARK OFFICE
CERTIFICATE OF CORRECTION

PATENT NO. : 12,441,900 B2
APPLICATION NO. : 17/904260
DATED : October 14, 2025
INVENTOR(S) : Caffier Guillaume and Liu Wing Yam It is certified that error appears in the above-identified patent and that said Letters Patent is hereby corrected as shown below:

On the Title Page

Item (71), Applicant, after "SOCIÉTÉ BIC," delete "Clichy (FR)" and insert --Clichy Cedex (FR)--.

Item (73), Assignee, after "SOCIÉTÉ BIC," delete "Clichy (FR)" and insert --Clichy Cedex (FR)--.

In the Claims

Column 18, Line 48, in Claim 16, after "15," delete "and/or".

Signed and Sealed this
Twenty-seventh Day of January, 2026

John A. Squires
*Director of the United States Patent and Trademark Office*